United States Patent
Sasse et al.

[19]

[11] Patent Number: 6,123,505
[45] Date of Patent: Sep. 26, 2000

[54] STATOR PRODUCED BY INJECTION MOLDING

[75] Inventors: Christoph Sasse, Schweinfurt; Uwe Dehrmann, Würzburg, both of Germany

[73] Assignee: Mannesmann Sachs AG, Schweinfurt, Germany

[21] Appl. No.: 09/140,305

[22] Filed: Aug. 26, 1998

[30] Foreign Application Priority Data

Aug. 26, 1997 [DE] Germany .............. 197 36 874

[51] Int. Cl.⁷ ........................................... F01D 1/02
[52] U.S. Cl. .................... 415/200; 415/186; 415/188; 415/191; 415/208.2; 415/208.3; 415/209.4; 415/208.5; 416/197 C; 249/57; 264/318; 264/328.1; 425/DIG. 58
[58] Field of Search ............................ 415/186, 188, 415/191, 200, 208.2, 208.3, 208.5, 209.4, 210.1, 211.1, 915; 416/197 C, 180; 249/57, 59, 60; 264/328.1, 318; 425/577, DIG. 58

[56] References Cited

U.S. PATENT DOCUMENTS

| | | | |
|---|---|---|---|
| 4,871,505 | 10/1989 | Lapeyre | 264/328.1 |
| 5,431,536 | 7/1995 | By et al. | 415/200 |
| 5,460,485 | 10/1995 | Sugiyama et al. | 415/208.2 |
| 5,547,365 | 8/1996 | Chuang | 425/577 |
| 5,616,000 | 4/1997 | Yamada et al. | 415/191 |
| 5,640,849 | 6/1997 | Abe et al. | |
| 5,655,875 | 8/1997 | Sekine | 415/123 |
| 5,660,784 | 8/1997 | Cruce et al. | 264/328.1 |

FOREIGN PATENT DOCUMENTS

| | | |
|---|---|---|
| 41 21 586 | 1/1993 | Germany . |
| 195 33 151 | 3/1997 | Germany . |
| 2-72846 | 6/1990 | Japan . |
| 3-35359 | 4/1991 | Japan . |
| 4-101850 | 9/1992 | Japan . |

OTHER PUBLICATIONS

Patent Abstracts of Japan, M–1428 Jun. 11, 1993, vol. 7/No. 306 JP5–26324.

*Primary Examiner*—Edward K. Look
*Assistant Examiner*—Matthew T. Shanley
*Attorney, Agent, or Firm*—Cohen, Pontani, Lieberman & Pavane

[57] ABSTRACT

A stator for a hydrodynamic torque converter which is produced by injection molding with axially drawn dies. The stator hub has stator blades produced by use of a thermoplastic material to fill the dies in the injection molding process. The stator blades are positioned relative to one another on the stator hub in such a way that the flow outlet of every stator blade is arranged at an offset of only the width of a gap relative to the flow inlet of the subsequent stator blade in the circumferential direction.

4 Claims, 2 Drawing Sheets

STATOR PRODUCED BY INJECTION MOLDING

BACKGROUND OF THE INVENTION

1. Field of the Invention

The invention is directed to a stator for a hydrodynamic torque converter, and in particular a stator produced by an injection molding process using axially drawn dies. The stator has a hub having blades provided thereon.

2. Description of the Relation Art

German reference DE 195 33 151 A1 discloses a stator for a hydrodynamic torque converter, the stator being arranged axially between a pump wheel and a turbine wheel. The stator carries stator blades by means of which hydraulic fluid flowing from the turbine wheel can be directed to the pump wheel at a desired angle.

A stator of the type mentioned above can be produced in various ways. For reasons of economy, an injection molding process with axially drawn tools or dies is preferred, wherein the dies have fill spaces in which material is introduced by means of the injection molding process. After the material solidifies, the dies are drawn apart axially and, in so doing, release the guide wheel. Aluminum is usually used as the material for an injection molding process of this kind. Disadvantageously however the low viscosity or fluidity of the aluminum material in the heated state allows material to exit from a contacting zone between the two dies, resulting in unwanted attachments or accretions to form at the stator blades. In order to remove these accretions, a chisel is inserted in the axial direction between a respective flow outlet of the stator blade and a flow inlet of a next stator blade. When cutting off the accretions, forces act on the inserted chisel which lead to expected breaking of the chisel, especially if the cutting edge of the chisel is very narrow in the circumferential direction. In view of this breakage, the cutting edge of the chisel of this kind usually has a width of at least 4 mm. But, as a detrimental consequence of this, there is formed an offset in the circumferential direction between the flow outlet of the stator blade and the flow inlet of the next guide wheel blade, such that the offset exceeds the 4-mm width required for the chisel. As a result, the guide length of the stator blade for the flow passing through it is shortened, which leads to poorer efficiency and poorer characteristics, adversely reducing torque multiplication of the converter.

Because of these disadvantages, stators are often produced from duroplastic, wherein duroplastic powder is introduced into a press mold and agglomerated or baked through heat and pressure to form a stator. While this produces a stator having a smooth surface, the surface cannot be subjected to subsequent cutting machining. Due to the required admixture of glass fibers and carbon fibers, machining of the surface forms cracks which coarsen the running surface of the material when making contact with another material such as steel. This results in considerable wear.

In the production process using duroplastic, it is not possible to connect an outer ring of a freewheel receiving the stator with the stator hub by means of an intermediary material engagement. It is likewise disadvantageous to press in the outer ring of the freewheel subsequently because the stator would crack in the region of its hub due to the brittleness of the duroplastic. Therefore, projections are provided at the inner diameter of the stator hub so as to positively engage grooves at the outer ring of the freewheel. However, cracks which lead to breakage form at these projections, especially as a result of sudden loading.

Duroplastic stators of the kind mentioned above are preferably drawn radially. While an optimum shape of the stator blades can be produced in this way, this production process is very expensive because a quantity of tools, corresponding to the quantity of guide wheel blades, is needed to remove the accretions formed on the outside of the stator blades after the duroplastic powder is agglomerated.

SUMMARY OF THE INVENTION

It is an object of the present invention to provide a stator that is produced in an economical manner, is resistant to breakage, has good efficiency as well as good characteristics and can easily be connected with an outer ring of a freewheel.

This object is met, according to the present invention, by producing the stator using an injecting molding process wherein thermoplastic material fills the dies. Guide wheel blades are positioned relative to one another on a stator hub. A flow outlet of each one of the blades is arranged at a desirable offset relative to a flow inlet of a next one of the blades, the offset being measured in the circumferential direction.

In order to economize on the cost of producing the guide wheel, the stator is drawn axially. According to the present invention, however, a thermoplastic material is introduced into the respective fill spaces of the dies through injection-molding filling, wherein the material is already viscous enough in the liquid state that it cannot exit from the respective fill space at a contact zone of the dies. Unwanted accretions at the stator blades are accordingly already prevented during the production process. Accordingly, subsequent machining of the stator after removal of the dies, for example, by means of a chisel introduced axially, can be dispensed with. Therefore, the stator blades are positioned relative to one another in such a way that the respective flow output of one stator blade is arranged at an offset relative to the flow input of a respective next stator blade, the offset having only a slit-shaped or gap-sized width. The gap-width offset is produced by a process in which the dies engage proceeding from both axial sides of the stator being formed and, when viewed in the circumferential direction, the dies have a common contact zone. As a result of a low pressure in the fill spaces, the wall thickness of the dies at the contact zone is thin enough so that the wall thickness of both dies only form the above-mentioned gap-width offset. The offset is at most 4 mm, but is normally considerably smaller and can easily be in the order of magnitude of 1 mm. As a result, the individual stator blades are lengthened so as to ensure an optimum flow guidance for the incoming hydraulic fluid at all times. This results in good efficiency and good characteristics, leading to an excellent torque multiplication for the torque converter.

Another advantage of the present invention is that thermoplastic material is very elastic and accordingly resistant to fracture.

Further, the production process mentioned above utilizing thermoplastic material advantageously enables an outer ring to be directly injection-molded around the stator so that a fixed connection is formed between the outer ring of the stator and the stator hub. The absence of a positive form-locking engagement between the outer ring and the hub of the stator eliminates notch stress which can ultimately lead to the formation of cracks, especially in the event of sudden loading. Preferably, the connection between the stator hub and the outer ring of the freewheel is improved by providing the outer ring of the freewheel with ribs extending substantially in the axial direction. The ribs allow for a slight positive engagement between the stator hub and outer ring of the freewheel. The ribs include a large number of shallow radial projections and depressions, so that torque is thereby transmitted to a great many locations on the circumference.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE PRESENTLY PREFERRED EMBODIMENTS

Figure 1:
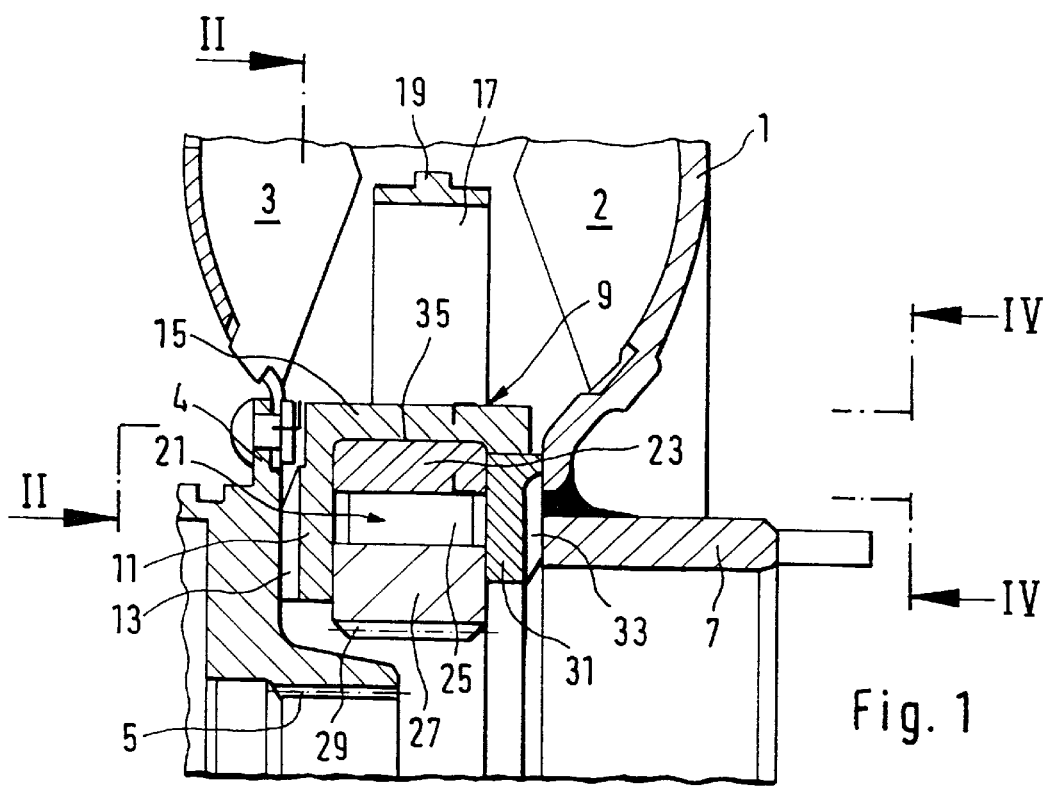
FIG. 1 is a sectional view of a torque converter showing the stator of the present invention.

FIG. 1 shows in detail only that region of a hydrodynamic torque converter relating to the present invention. An illustration and description of the torque converter in its entirety has been omitted because torque converters of this kind are known from the prior art for example, from German reference DE 41 21 586 A1.

A pump shell 1 forms a pump wheel 2 that cooperates with a turbine wheel 3. A turbine hub 4 is fixedly connected in the radial inner region of the turbine wheel 3. A toothing 5 is arranged on the turbine hub 4 so as to engage a drive shaft, not shown, such as a transmission input shaft.

The pump shell 1 is fastened in the radial inner region to a hollow shaft 7 extending in the direction of a power take-off, as for example, an engine output shaft. A stator 9 is arranged axially between the pump wheel 2 and the turbine wheel 3. A first axial bearing 11 supports the stator 9 in the region between the turbine hub 4 and a freewheel 21 and a second axial bearing 31 supports the stator 9 in the region between the freewheel 21 and the radial inner region of the pump shell 1 and the hollow shaft 7. An arrangement of grooves 13, 33 is provided at the respective axial bearing 11, 31 so as to supply hydraulic fluid to the converter circuit, especially via grooves 13 of the axial bearing 11.

Figure 2:
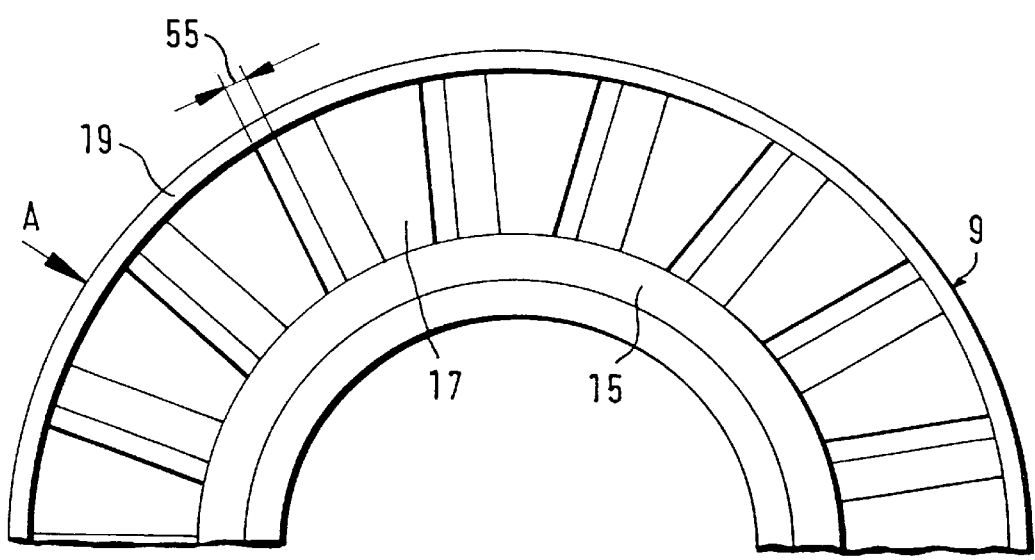
FIG. 2 is a view of the stator as taken along section line II—II in FIG. 1.

The axial bearing 11 is constructed in one piece with the stator hub 15. Stator blades 17 are provided in the circumferential region of the stator hub 15, the stator blades 17 extend radially and are connected with one another at their radial outer ends by an outer ring 19 of the stator 9 (FIG. 2). The freewheel 21 on which the stator 9 is arranged has a freewheel outer ring 23 that is guided via clamping bodies 25 on an inner ring 27 of the freewheel 21. A toothing 29 is arranged on the inner ring 27 so as to connect with a driven element, not shown, so that the inner ring 27 is fixed with respect to rotation relative to the driven element. Hydraulic fluid is guided radially between the driven element and the driven shaft, which is fixed with respect to rotation relative to the turbine hub 4, for supplying the converter circuit via the grooves 13.

A rib arrangement 37 is provided at a circumference 35 of the freewheel outer ring 23. The rib arrangement 37 has a series of projections 39 and depressions 41, alternating in the circumferential direction. The projections 39 have the greatest radial distance, whereas the depressions 41 have the least radial distance. As will be explained more fully hereinafter, injection molding of the freewheel outer ring 23 is carried out during the production process for the stator hub 15, so that the projections 39 of the outer ring 23 of the freewheel engage radially in the stator hub 15. The stator hub 15, meanwhile, projects into the depressions 41, thereby further radially engaging the outer ring 23 of the freewheel.

Figure 3:
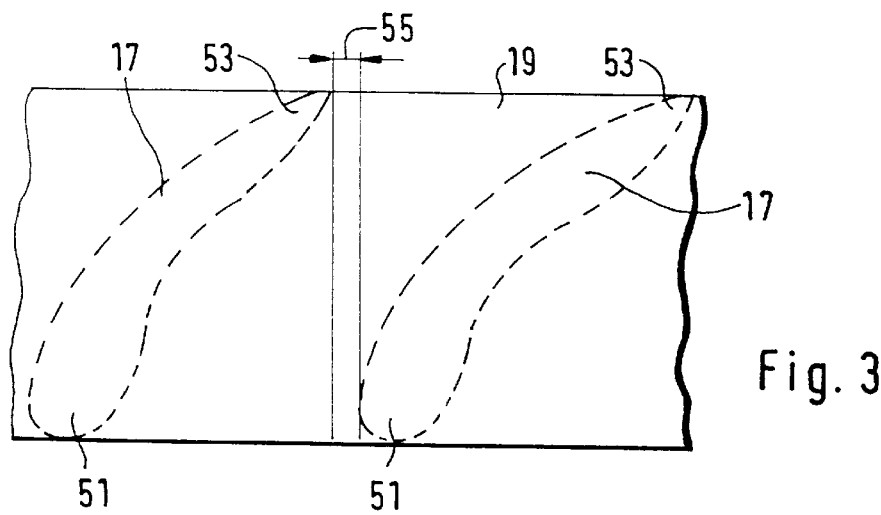
FIG. 3 is a top view of the stator as taken along direction A in FIG. 2.
Figure 4:
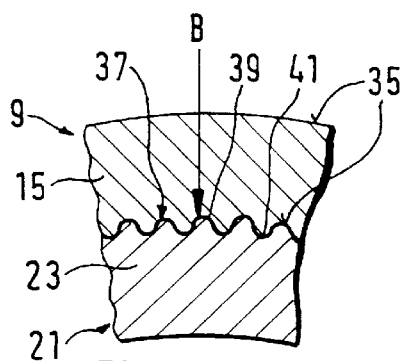
FIG. 4 is a sectional view of the connection of the hub of the stator with an outer ring of a freewheel as taken along section line IV—IV in FIG. 1.
Figure 5:
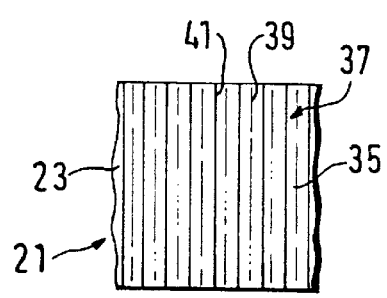
FIG. 5 is a view of the outer ring of the freewheel as taken along direction B in FIG. 4.

As is shown in FIG. 3, the stator blades 17 are constructed in such a way that, when viewed in the circumferential direction, a flow outlet 53 of the first stator blade 17 is spaced from a flow inlet 51 of the next stator blade 17 in the circumferential direction only by a gap-width offset 55. The offset 55 has a maximum width of 4 mm in the circumferential direction, being easily reduced to a width of only 1 mm.

Figure 6:
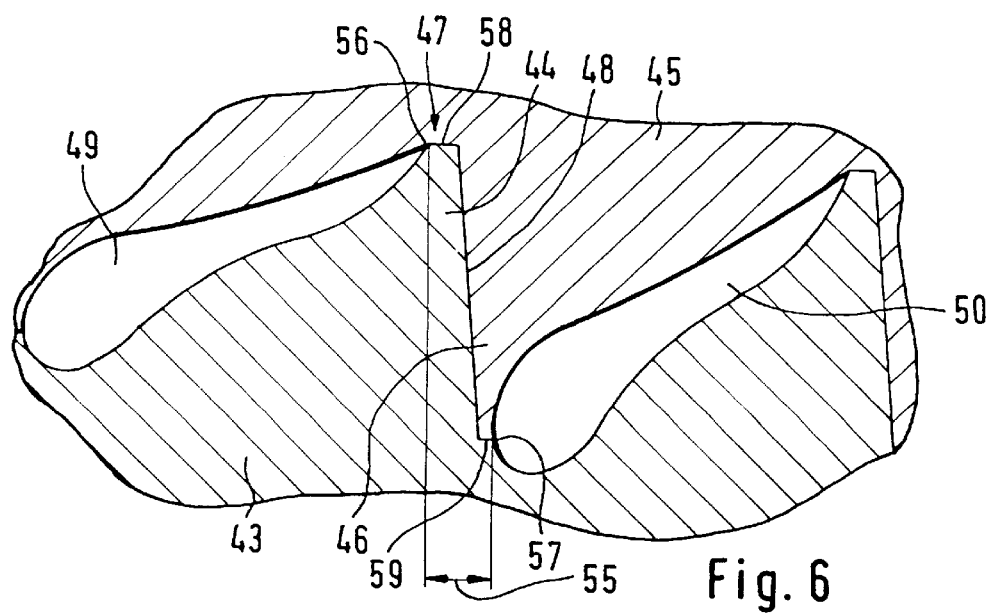
FIG. 6 is a detailed view of dies for producing the stator.

Reference is had to FIG. 6 for further explanation of how the inventive stator blades 17 are produced. Dies 43, 45, define respective fill spaces 49, 50 in which the stator blades 17 are formed. The dies 43, 45 are brought into contact with one another in the axial direction, wherein overlapping regions 44, 46 extend substantially in the axial direction so as to be in communication along a contact zone 48. As can be seen from FIG. 6, the width of the two overlapping regions 44, 46 in the circumferential direction yields the gap-width offset 55. As soon as the two dies 43, 45 are brought together axially, thermoplastic material is introduced via a pour-in opening, not shown, into the dies 43, 45 and, in so doing, into the fill spaces 49, 50 in particular. The viscous consistency, of the thermoplastic material prevents the material from exiting between the two dies 43, 45, at, for example, troublesome contact zones 56, 57. The contact zone 56, for example, is located at the axial free end of the overlapping region 44 of the die 43 and associated stop 58 provided at the die 45. Thus, contact zone 56 is associated with the flow outlet 53 of the stator blade 17 to be formed. The other troublesome contact zone 57 is located at the axial free end of the overlap 46 of the die 45 and contacts stop 59 provided at the die 43. The contact zone 57 is therefore associated with the flow inlet 51 of the stator blade 17 to be formed.

As soon as the thermoplastic material introduced into the fill spaces 49, 50 through the injection molding process is hardened, the two dies 43, 45 are pulled apart by an axial movement and accordingly release the stator 9 with the stator blades 17. The stator blades 17 therefore have the gap-shaped offset 55 between the flow outlet 53 of a first stator blade 17 and the flow inlet 51 of the next stator blade 17 in the circumferential direction, the width of the offset 55 being determined by the two overlaps 44, 46 shown in FIG. 6. Advantageously therefore the guide length of the stator blades 17 is sufficiently long to enable hydraulic fluid to be introduced.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. An injection molded stator for a hydrodynamic torque converter, comprising: a thermoplastic stator hub; thermoplastic stator blades arranged at the stator hub, so as to have a flow inlet configured at a radially inner end of the blade and a flow outlet configured at a radially outer end of the blade, the stator blades being positioned relative to one another on the stator hub so that the flow outlet of every stator blade is arranged at an offset of only a width of a gap relative to the flow inlet of a subsequent stator blade in the circumferential direction; a freewheel outer ring, having a circumference, the stator hub having depressions and projections and being arranged so as to surround the freewheel outer ring; and a rib arrangement provided at the circumference of the outer ring so as to extend at least substantially in an axial direction, the rib arrangement having radial projections and depressions that engage corresponding depressions and projections in the stator hub.

2. The stator according to claim 1, wherein the width of the offset between the stator blades does not exceed 4 mm in the circumferential direction.

3. The stator according to claim 1, wherein the stator hub is injection molded to the freewheel outer ring.

4. A process for producing a stator for a hydrodynamic torque converter, comprising the steps of:
providing axially drawn dies;
injecting a thermoplastic material into the dies to form the stator, the dies being configured so that each stator blade has a flow inlet configured at a radially inner end of the blade and a flow outlet configured at a radially outer end of the blade, the stator blades being positioned relative to one another on the stator hub so that the flow outlet of every stator blade is arranged at an offset of only a width of a gap relative to the flow inlet of a subsequent stator blade in the circumferential direction; providing a freewheel outer ring having a circumference, the stator hub having depressions and projections; arranging the stator hub to surround the freewheel outer ring; and providing a rib arrangement at the circumference of the outer ring so as to extend at least substantially in an axial direction, the rib arrangement having radial projections and depressions that engage corresponding depressions and projections in the stator hub.

* * * * *